United States Patent [19]

DeGraffenreid

[11] Patent Number: 4,749,485
[45] Date of Patent: * Jun. 7, 1988

[54] TRIANGULAR FILTER CARTRIDGE HAVING TRIANGULAR PASSAGE

[76] Inventor: Howard T. DeGraffenreid, P.O. Box 261, Inola, Okla. 74036

[*] Notice: The portion of the term of this patent subsequent to Sep. 23, 2003 has been disclaimed.

[21] Appl. No.: 900,165

[22] Filed: Aug. 25, 1986

Related U.S. Application Data

[62] Division of Ser. No. 632,451, Jul. 19, 1984, Pat. No. 4,613,438.

[51] Int. Cl.$^4$ ............................................. B01D 29/32
[52] U.S. Cl. .................. 210/323.1; 210/346; 210/486; 55/529
[58] Field of Search .................. 210/323.1, 323.2, 331, 210/345, 346, 347, 486; 55/482, 521, 529

[56] References Cited

U.S. PATENT DOCUMENTS

| | | | |
|---|---|---|---|
| 2,210,213 | 8/1940 | Long | 210/131 |
| 2,312,999 | 3/1943 | de Langen | 210/153 |
| 2,587,903 | 3/1952 | Rood | 210/140 |
| 2,765,084 | 10/1956 | Tursky | 210/184 |
| 2,919,030 | 12/1959 | Grant et al. | 210/488 |
| 3,223,244 | 12/1965 | Topol et al. | 210/247 |
| 3,241,679 | 3/1966 | Walter | 210/444 |
| 3,291,310 | 12/1966 | Marvel | 210/169 |
| 3,330,101 | 7/1967 | Murphy, Jr. | 55/484 |
| 3,556,300 | 1/1971 | Codo | 210/232 |
| 3,662,895 | 5/1972 | Tuffneli et al. | 210/439 |
| 3,853,509 | 12/1974 | Leliaert | 55/529 |
| 3,880,757 | 4/1975 | Thomason | 210/167 |
| 4,057,502 | 11/1977 | Crumrine et al. | 210/440 |
| 4,058,463 | 11/1977 | Bartik | 210/317 |
| 4,065,392 | 12/1977 | Gammon | 210/282 |

FOREIGN PATENT DOCUMENTS

| | | | |
|---|---|---|---|
| 1172099 | 10/1958 | France | 210/323.2 |
| 1425376 | 12/1965 | France | 210/323.1 |
| 2077183 | 10/1971 | France | |
| 2388589 | 11/1978 | France | |
| 626699 | 10/1961 | Italy | |
| 14396 | 6/1913 | United Kingdom | 210/323.2 |
| 117395 | 7/1918 | United Kingdom | 210/323.2 |
| 555902 | 6/1977 | U.S.S.R. | 210/323.2 |

Primary Examiner—Richard V. Fisher
Assistant Examiner—Wanda L. Millard
Attorney, Agent, or Firm—Jeffers, Hoffman & Niewyk

[57] ABSTRACT

An improved triangular filter cartridge and apparatus is provided comprising a generally cylindrical vessel having a plurality of generally triangularly shaped filter cartridges disposed therein. Each triangular filter cartridge has one of its substantially flat sides slightly spaced apart from and in direct facing relationship with the inner surface of the vessel, whereby a greater number of triangular filter cartridges can be compactly disposed within said vessel to increase the filtration capacity thereof. Each filter cartridge includes a passage that is triangularly shaped in a plane perpendicular to the axial direction.

3 Claims, 3 Drawing Sheets

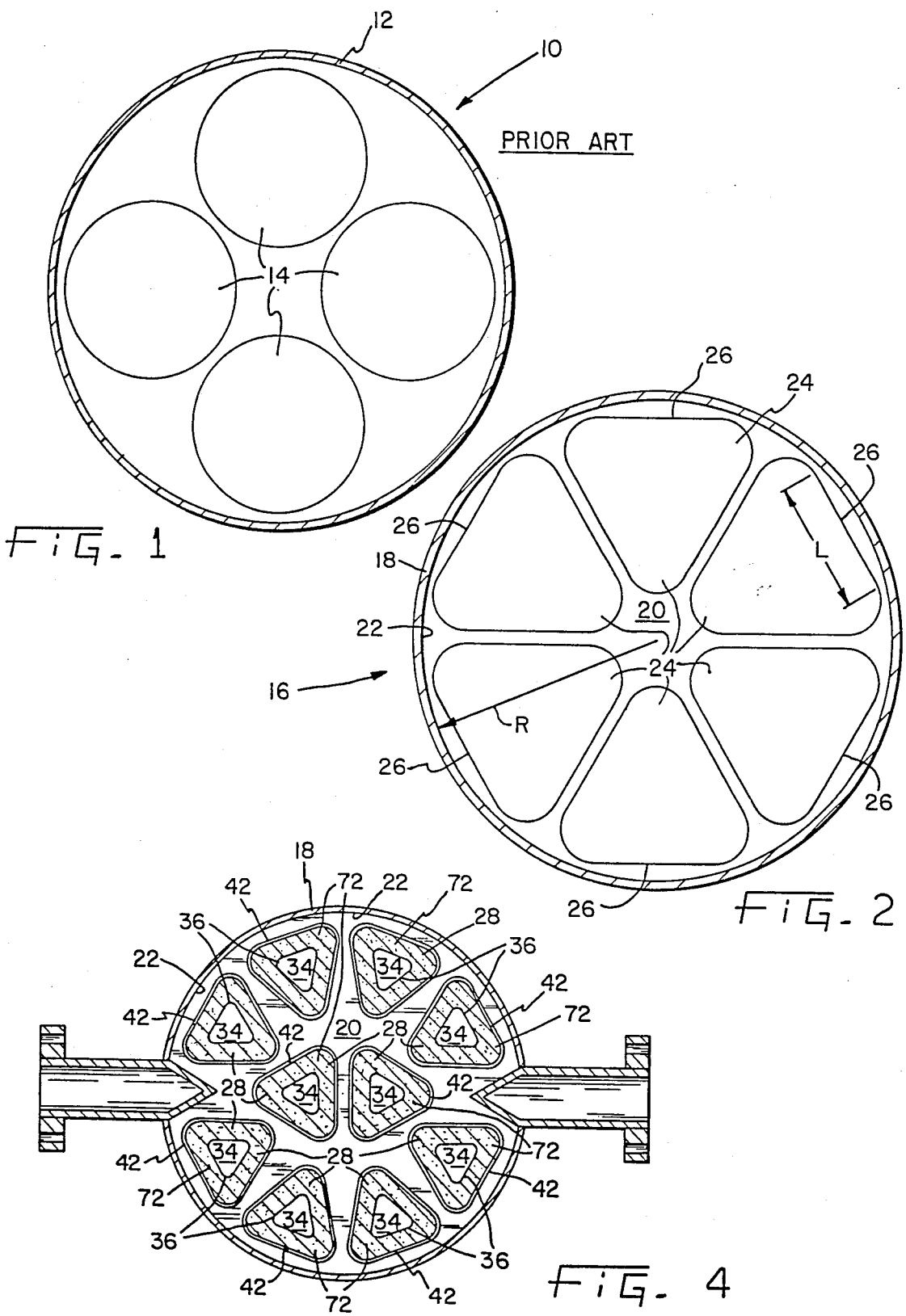

TRIANGULAR FILTER CARTRIDGE HAVING TRIANGULAR PASSAGE

This is a division of application Ser. No. 632,451, filed July 19, 1984, which is now U.S. Pat. No. 4,613,438.

BACKGROUND OF THE INVENTION

This invention pertains to a fluid filter apparatus, and more particularly to generally triangular shaped filter cartridges adapted to be compactly disposed in a vessel to increase filtration capacity.

Typically, filtration apparatuses generally comprise a filter vessel of generally cylindrical shape containing a number of replaceable filter cartridges for filtering contaminants from a fluid. A typical filter cartridge comprises a filter medium or media, a support member for the medium, and an end cap on each end of the medium. These filter vessels are generally cylindrical shaped for ease of manufacturing, and a desired objective is to have as many replaceable filter cartridges as possible disposed therein to increase the filtration capacity of a vessel of given diameter.

Currently, most filter cartridges are also generally circular in shape, which has been dictated by the shape of the support member for the filter medium. Support members are required not only to withstand forces imposed by a differential fluid pressure transversely applied across the filter cartridges, but also the forces longitudinally applied by the device or mechanism for securely holding the filter cartridges in the vessel. Generally, these support members are in the form of a perforated tube, and are frequently assisted in providing support by a standpipe longitudinally disposed therein. The support member must be sufficiently strong to withstand the above-described transverse and longitudinal forces, and previously the most economical shape for a support member has been cylindrical, thereby resulting in the filter cartridges likewise being of generally cylindrical shape. Thus, if a user desires a filter vessel of specified diameter, then the number of filter cartridges is dictated thereby. Further, if a desired number of filter cartridges is specified so as to provide a desired filtration capacity, then the diameter of the filter vessel is dictated by the quantity and the overall diameter of the filter cartridges.

Clearly, one of the disadvantages of the above prior art filter apparatuses is that a filter vessel of specified diameter and specified filtration capacity may not be of sufficient size to house the requisite number of filter cartridges to provide the desired filtration capacity. For example, a typical filter vessel is one having a diameter of sixteen inches, and a typical filter cartridge is one having a diameter of six inches, and only four such filter cartridges can be suitably placed in such a vessel. If the four filtration cartridges are not adequate to provide the desired filtration capacity of such a size vessel, the apparatus will be unsatisfactory to the user.

Another disadvantage with the above filter apparatuses concerns the generally cylindrically shaped and thin-walled support members, which generally have low collapsing pressure thresholds, and therefore easily collapse under applied external pressures that exceed their thresholds. Circumventing this disadvantage requires the support member to be constructed with a thicker wall, thereby possibly necessitating decreasing the depth or thickness of the filter medium and its filtration capacity.

In view of the above, there clearly exists a need for filter cartridges having shapes that permit a greater number thereof to be housed within a filter vessel of specified diameter to provide a desired filtration capacity.

SUMMARY OF THE INVENTION

By constructing the filter cartridges with a generally triangularly shaped outer peripheral surface defining three substantially flat sides, and disposing them within the cylindrical vessel such that one of the sides is slightly spaced apart from the vessel inner surface and in direct facing relationship therewith, more such filter cartridges can be disposed within the cylindrical vessel than circularly shaped cartridges, wherein the outer peripheral surface area of one circular cartridge is the same as that for one triangular cartridge, thereby increasing the filtration capacity of a filter vessel of specified diameter. Moreover, since more triangularly shaped filter cartridges can be housed within a cylindrical filter vessel of specified diameter, a more uniform flow distribution of fluid through the filter cartridges is realized.

Another advantage provided by the present invention is that of constructing the structural support member in a generally triangular shape similar to that of the filter medium. The collapsing pressure threshold of a generally triangularly shaped support member is greater than that of a cylindrically shaped support member, and therefore can withstand greater external forces. Furthermore, because of the higher collapsing pressure thresholds, triangularly shaped support members can be constructed with a relatively thinner wall than cylindrically shaped support members, thereby maximizing the depth or thickness of the filter medium and, accordingly, its filtration capacity.

In accordance with one form of the invention there is provided a filter cartridge for filtering contaminants from a fluid comprising a permeable filter medium adapted for filtering contaminants from a fluid and having oppositely disposed ends and a passage disposed therein, wherein the passage opens at one of the ends. A porous support member is provided in supporting engagement with the filter medium and is adapted to have a fluid pass therethrough. An end cap is sealingly secured to the one end of the filter medium and has an opening therein communicating with the passage. The permeable filter medium has a triangular shaped outer peripheral surface defining at least three substantially flat sides disposed at acute angles to each other, whereby a fluid to be filtered passes through the filter medium and support member and through the passage and out the end cap opening.

It is an object of the present invention to provide an improved generally triangularly shaped filter cartridge adapted to be compactly disposed in a cylindrical vessel.

Yet another object of the present invention is to provide a fluid filter apparatus of a specified size with increased filtration capacity.

Further objects of the present invention will appear as the description proceeds.

BRIEF DESCRIPTION OF THE DRAWINGS

The above-mentioned and other features and objects of this invention and the manner of attaining them, will become more apparent and the invention itself will be better understood by reference to the following description of an embodiment of the invention taken in conjunction with the accompanying drawings, wherein:

FIG. 1 is a transverse cross-sectional view of a prior art filter apparatus;

FIG. 2 is a transverse cross-sectional view of a filter including cartridges according to the present invention;

FIG. 4 is a sectional view of FIG. 3 taken along line 4—4 and viewed in the direction of the arrows;

DESCRIPTION OF A PREFERRED EMBODIMENT

Figures 3, 5:
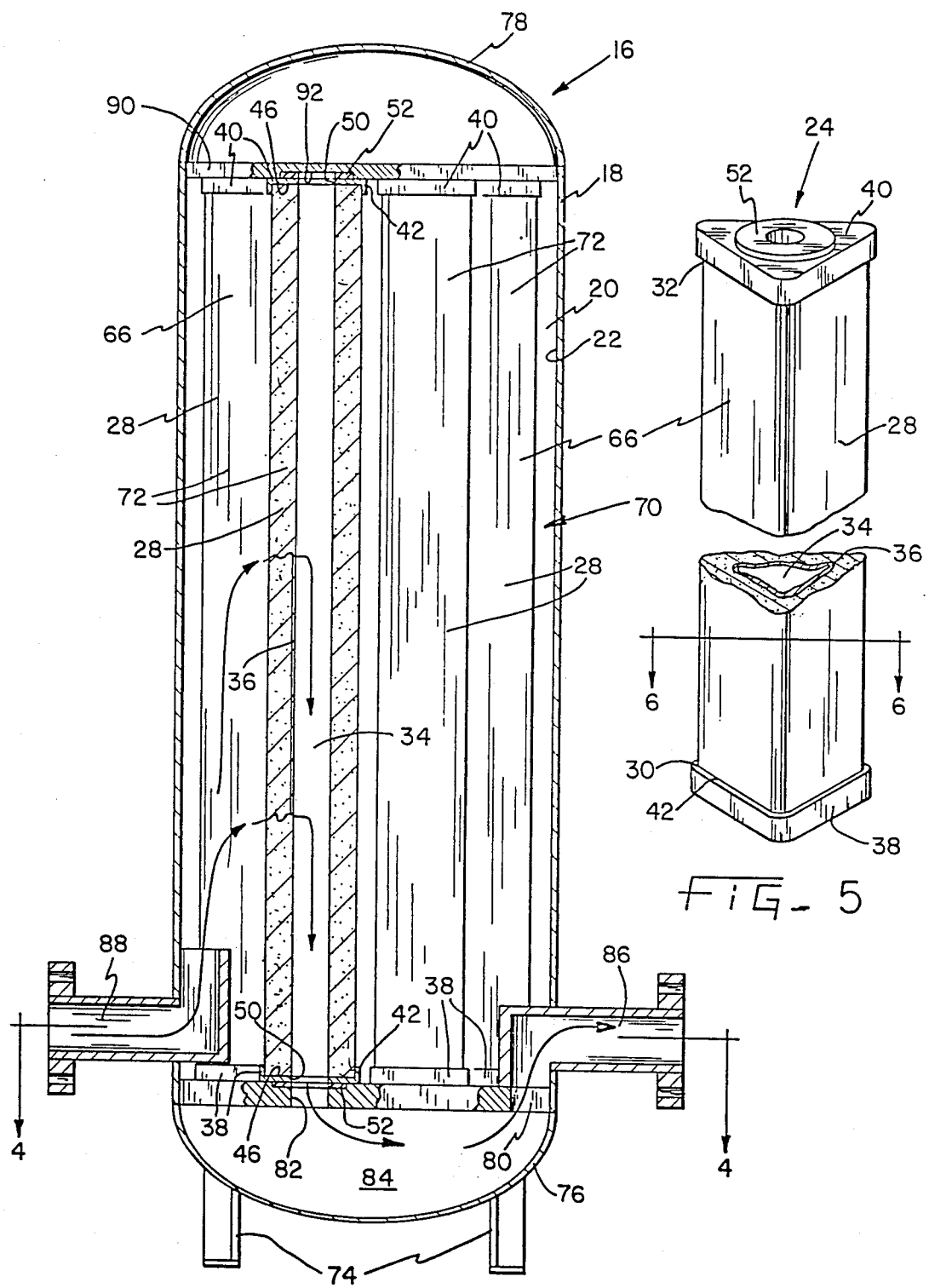
FIG. 3 is an elevational broken-away and partially sectioned view of a second filter including cartridges of the present invention.
FIG. 5 is a broken-away perspective view of a filter cartridge of the present invention.

Referring initially to FIG. 1, a prior art filter apparatus 10 is illustrated comprising vessel 12 and four filter cartridges 14, and in a typical embodiment vessel 12 has a 16 inch inner diameter and filter cartridges 14 have a 6 inch diameter. As can be clearly seen, only four cylindrically shaped filter cartridges 14 can be suitably disposed in vessel 12, thereby limiting the filtration capacity thereof. In comparison, FIG. 2 illustrates a filter apparatus 16 comprising cylindrically shaped vessel 18 having an interior space 20 and a generally cylindrically shaped inner surface 22 In this illustration, vessel 18 also has a 16 inch inner diameter and contains 6 filter cartridges 24 according to the present invention, wherein each filter cartridge 24 has approximately the same outer peripheral surface area as each filter cartridge 14 in FIG. 1. Filter cartridges 24 are generally triangular in shape with one of their generally flat sides 26 slightly spaced apart from and in direct facing relationship with inner surface 22. Because of this geometric arrangement of filter cartridges 24 in vessel 18, a greater number are compactly disposed therein resulting in a greater filtration capacity for apparatus 16. Where the available space in which filter apparatus 16 is limited, thereby restricting the diameter size of vessel 18, the triangularly shaped filter cartridges 24 will provide a greater filtration capacity for that size vessel 18.

Figure 6:
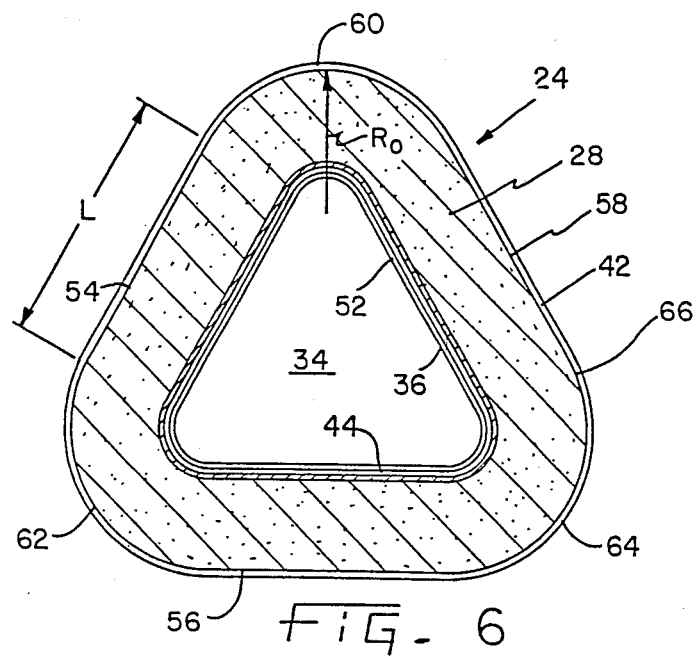
FIG. 6 is a sectional view of FIG. 5 taken along line 6—6 and viewed in the direction of the arrows.
Figure 7:
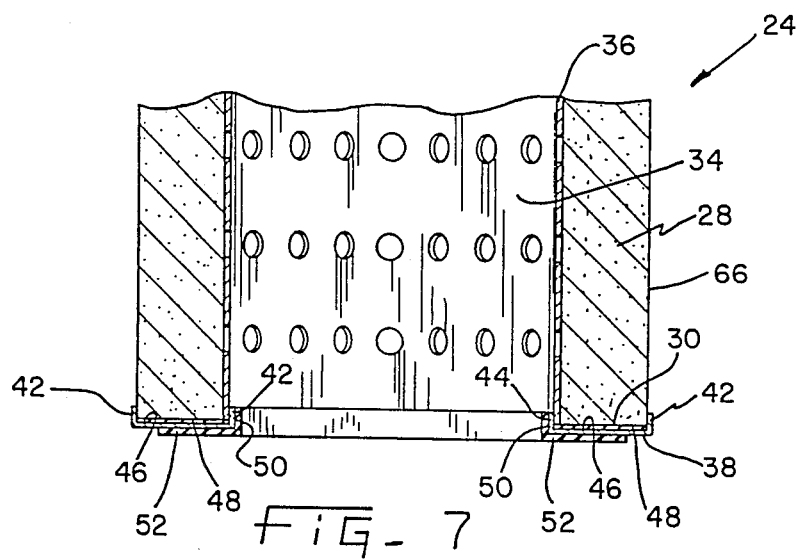
FIG. 7 is an enlarged fragmentary and cross-sectional view of one end of the filter cartridge in FIG. 5.

Referring now to FIGS. 5, 6, and 7, generally triangularly shaped filter cartridge 24 is elongate and comprises permeable filter medium 28 having oppositely disposed ends 30, 32 and passage 34 longitudinally extending therebetween. A support member such as thin-walled perforated support member 36 is disposed within passage 34 in supporting engagement against filter medium 28. A pair of generally triangularly shaped end caps 38, 40 are provided to be disposed on ends 30, 32 of filter medium 28. End caps 38, 40 are similar in structure, and only a description of end cap 38 follows. End cap 38 includes a generally triangularly shaped outer flange 42 and a similar generally triangularly shaped inner flange 44 extending outwardly therefrom and defining therebetween flat surface 46. Flanges 42, 44 are spaced apart a distance equal to the thickness of filter medium 28 and support member 36, and a coating of a suitable adhesive 48 is applied between flanges 42, 44 on flat surface 46. The ends of filter medium 28 and support member 36 are securely positioned between flanges 42, 44 and against flat surface 46 to be sealingly bonded thereto to prevent passage or leakage of a fluid therebetween. End cap 38, as well as end cap 40, has a generally triangularly shaped opening 50 with a suitable gasket 52 secured therein. As described and illustrated, filter medium 28 has three substantially flat sides 54, 56, 58 joined together by curved portions 60, 62, 64 defining triangularly shaped outer peripheral surface 66.

Filter cartridge 24 having support member 36 disposed within passage 34 of filter medium 28 is designed for outside-in flow of a fluid to be filtered, wherein the fluid first passes through outer peripheral surface 66 and through the body of filter medium 28 into passage 34. With this type of outside-in flow pattern, support member 36 is disposed within passage 34 to prevent collapse of filter medium 28 due to the differential fluid pressure applied thereto, along with withstanding longitudinal forces applied primarily by the device or mechanism for securing cartridge 24 in vessel 18.

For the inside-out flow patterns, wherein the fluid to be filtered is first introduced through passage 34 for filtering through filter medium 28, support member 36 is disposed in supporting engagement against outer peripheral surface 66 to counteract the differential fluid pressure applied thereto.

Filter medium 28 can be made of any suitable permeable material, including a moldable resin material having sufficient density and capable of self-support without need of support member 36 and end caps 38,40 thereby reducing manufacturing costs. Further, filter medium 28 can be of any desired shape such as pleated, non-pleated, and a solid depth type, and multiple types of filter mediums may be used in a single filter cartridge 24. Also, sides 54,56,58 can be formed having a convex contour, rather than being flat, thereby increasing the collapse strength of medium 28. As to the particular type of fluid to be filtered, the present invention contemplates filtering any type of fluid having any type or size of foreign particulate, or other contaminants whether solid or fluid.

End caps 38, 40 generally assist support member 36 in giving structural integrity to filter medium 28, and may be made of any suitable type of material, such as various plastic materials, for example, epoxy, polyesters, plastisol, metal, and fibrous cellulosic materials. Further, gaskets 52 can be made of any suitable material for use with a filter cartridge 24.

In constructing the shape of filter cartridges 24 to compactly fit within vessel 18 as illustrated in FIG. 2, the following relationship exists between the inner radius R (FIG. 2) of vessel 18 and the length L (FIG. 6) of sides 54, 56, 58 and the radius of curvature $R_o$ of curved portions 60, 62, 64:

$$2 \pi R = 2 \pi R_o + 3L$$

By determining filter cartridges 24 according to the above relationship, an arrangement of filter cartridges 24 can be disposed in vessel 18 as indicated in FIG. 2. The formula is used to determine the length L of sides 54,56,58 of a delta-designed cartridge, such as cartridge 24, with relation to a standard circular cartridge, such as a 6" outer diameter circular cartridge.

Referring now to FIGS. 3 and 4, filter apparatus 16 is illustrated with vessel 18 housing filter cartridge assembly 70 comprising a plurality of filter cartridges 72, which are generally triangular in shape and smaller in transverse cross-section than filter cartridges 24 to illustrate a different arrangement from that in FIG. 2. Filter cartridges 72 are identical to filter cartridges 24 except for the difference in size. Vessel 18 includes four supports 74, only two of which are illustrated, with concavely shaped ends 76, 78. Vessel 18 further includes deck plate 80 secured in end 76 and having a plurality of openings 82 disposed therein to allow communication between outlet chamber 84 and interior space 20, and outlet chamber 84 includes outlet 86 for discharging a filtered fluid. Inlet 88 in vessel 18 permits a fluid to be filtered to be received therethrough into interior space 20. A like plurality of filter cartridges 72 are disposed in vessel 18 with their respective gaskets 52 sealingly disposed in respective openings 82, and with respective end caps 38 sealingly disposed against deck plate 80. Cartridges 72 are secured in an upright manner by a hold-down plate 90 secured in vessel end 78, and closed openings 92 in hold-down plate 90 have gaskets 52 of the upper ends of cartridges 72 sealingly disposed therein and with end caps 40 sealingly disposed against the bottom surface of hold down plate 90. Other methods are available for securing cartridges 72 in vessel 18, and one such method is described in U.S. Pat. No. 4,320,005 of the present applicant, which patent is incorporated herein by reference.

As illustrated in FIG. 4, since cartridges 72 are not constructed according to the above formula so as to be arranged in vessel 18 as illustrated in FIG. 2, the inwardly disposed vertices of cartridges 72 form a generally circular space which can have other cartridges 72 disposed therein. As with the embodiment in FIG. 2, one of the flat sides of each cartridge 72 is slightly spaced apart from and in direct facing relationship with inner surface 22 of vessel 18 to provide maximum utilization of available space therein.

In operation, a fluid to be filtered is urged through inlet 88 into interior space 20 and passes through filter mediums 28, which filters contaminants therefrom. The filtered fluid then passes through perforated support members 36 into passages 34 for downward travel therethrough through end cap openings 50 and openings 82 into outlet chamber 84. Openings 82 are also generally triangularly shaped to permit proper fit and orientation of triangularly shaped gaskets 52. The filtered fluid then is drawn from outlet chamber 84 through outlet 86.

The reverse filtration may also be used with support members 36 disposed against respective outer peripheral surfaces 66 of cartridges 72, wherein the fluid to be filtered will follow the reverse path into outlet 86, outlet chamber 84 and into passages 34 for filtration through filter mediums 28. After passage through respective support members 36, the filtered fluid is discharged from vessel 18 through inlet 88.

While this invention has been described as having a preferred embodiment, it will be understood that it is capable of further modifications. This application is therefore intended to cover any variations, uses, or adaptations of the invention following the general principles thereof, and including such departures from the present disclosure as come within known or customary practice in the art to which this invention pertains and fall within the limits of the appended claims.

What is claimed is:

1. A filter cartridge for filtering contaminants from a fluid comprising:
    a permeable filter medium adapted for filtering contaminants from a fluid and having oppositely disposed ends and a passage disposed therein extending in a axial direction, said passage being open at one of said ends and being triangularly shaped in a plane perpendicular to said axial direction,
    a generally triangular shaped porous support member in said passage being in supporting engagement with said permeable filter medium and adapted to have a fluid pass therethrough, said porous support member being triangularly shaped in a plane perpendicular to said axial direction, and
    an end cap being sealingly secured to one end of said filter medium and having an opening therein communicating with said passage,
    said permeable filter medium having a triangular shaped outer peripheral surface having three substantially flat sides disposed at arcuate angles to each other, adjacent ones of said sides being joined by an arcuate portion so that the cartridge has rounded corners.

2. A filter cartridge for filtering contaminants from a fluid comprising:
    a permeable filter medium adapted for filtering contaminants from a fluid and having oppositely disposed ends and a triangular shaped passage disposed therein, said passage being open at one of said ends,
    a generally triangular shaped porous support member in said passage being in suppporting engagement with said permeable filter medium and adapted to have a fluid pass therethrough, and
    an end cap being sealingly secured to one end of said filter medium and having an opening therein communicating with said passage,
    said permeable filter medium having a triangular shaped outer peripheral surface having three substantially flat sides disposed at arcuate angles to each other, adjacent ones of said sides being joined by an arcuate portion so that the cartridge has rounded corners,
    said end cap including two axially extending, generally triangular shaped flange members, one end of the filter medium and said support member being sealingly secured between said flange members.

3. The filter cartridge of claim 2 including a second end cap sealingly secured to said filter medium at the other end thereof, said second end cap including two axially extending, generally triangular shaped flange members, the other end of the filter medium and support member being sealingly secured between the flange members of said second end cap.

* * * * *